(12) United States Patent
Yuzurihara et al.

(10) Patent No.: US 9,806,629 B2
(45) Date of Patent: Oct. 31, 2017

(54) SINGLE-PHASE INVERTER

(71) Applicant: KYOSAN ELECTRIC MFG. CO., LTD., Yokohama-shi, Kanagawa (JP)

(72) Inventors: Itsuo Yuzurihara, Yokohama (JP); Shinichi Kodama, Yokohama (JP); Toshiyuki Adachi, Yokohama (JP)

(73) Assignee: KYOSAN ELECTRIC MFG. CO., LTD., Yokohama-shi (JP)

( * ) Notice: Subject to any disclaimer, the term of this patent is extended or adjusted under 35 U.S.C. 154(b) by 20 days.

(21) Appl. No.: 14/781,166

(22) PCT Filed: Dec. 26, 2013

(86) PCT No.: PCT/JP2013/084821
§ 371 (c)(1),
(2) Date: Sep. 29, 2015

(87) PCT Pub. No.: WO2015/029273
PCT Pub. Date: Mar. 5, 2015

(65) Prior Publication Data
US 2016/0308457 A1 Oct. 20, 2016

(30) Foreign Application Priority Data

Aug. 27, 2013 (JP) .................. 2013-175870

(51) Int. Cl.
*H02M 7/5387* (2007.01)
*H02M 7/04* (2006.01)
(Continued)

(52) U.S. Cl.
CPC .............. *H02M 7/04* (2013.01); *H02M 1/34* (2013.01); *H02M 7/48* (2013.01); *H02M 7/5387* (2013.01);
(Continued)

(58) Field of Classification Search
CPC ............ Y02B 70/1416; Y02B 70/1425; Y02B 70/1441; H02M 2007/4815; H02M 7/5387
See application file for complete search history.

(56) References Cited

U.S. PATENT DOCUMENTS 4,533,986 A * 8/1985 Jones .................. H02M 1/4208
323/222
5,574,636 A 11/1996 Lee et al.
(Continued)

FOREIGN PATENT DOCUMENTS

CN 101951186 A 1/2011
DE 196 36 248 C1 12/1997
(Continued)

OTHER PUBLICATIONS

Office Action dated Mar. 8, 2016, issued in counterpart Chinese Patent Application No. 201380075261.3, with English translation. (8 pages).
(Continued)

*Primary Examiner* — Gary L Laxton
(74) *Attorney, Agent, or Firm* — Westerman, Hattori, Daniels & Adrian, LLP

(57) ABSTRACT

In an inverter circuit, more particularly in a single-phase inverter, soft switching is performed with a simple configuration to prevent switching loss of a switching element. A resonance circuit is configured by a resonant capacitor provided on the power supply side of a bridge circuit constituting a single phase inverter, a resonant inductor provided on the output side of the bridge circuit, and the bridge circuit. A resonance current passing through the resonance circuit allows zero voltage switching (ZVS) and zero current switching (ZCS) to be implemented at the rising time of main switching elements constituting the bridge circuit, and the zero voltage switching is implemented by (Continued)

means of zero voltage of the resonant capacitor at the falling time of the main switching elements constituting the bridge circuit.

2 Claims, 21 Drawing Sheets

(51) Int. Cl.
*H02M 7/48* (2007.01)
*H02M 1/34* (2007.01)
(52) U.S. Cl.
CPC .. *H02M 2007/4815* (2013.01); *Y02B 70/1441* (2013.01)

(56) References Cited

U.S. PATENT DOCUMENTS

| | | | | |
|---|---|---|---|---|
| 6,038,142 | A * | 3/2000 | Fraidlin | H02M 3/3372 363/132 |
| 6,438,004 | B1 | 8/2002 | Tanaka et al. | |
| 7,009,860 | B2 * | 3/2006 | Kazutoshi | H02J 5/005 307/10.1 |
| 8,711,580 | B2 * | 4/2014 | Zhang | H02M 1/32 323/901 |
| 8,730,700 | B2 | 5/2014 | Yuzurihara et al. | |
| 2003/0156435 | A1 | 8/2003 | Morimoto et al. | |
| 2011/0090717 | A1 * | 4/2011 | Lee | H02M 3/33584 363/21.02 |
| 2012/0063184 | A1 | 3/2012 | Mazumder | |
| 2012/0140524 | A1 | 6/2012 | Manabe et al. | |
| 2013/0083564 | A1 * | 4/2013 | Bai | H02M 3/33592 363/21.02 |
| 2015/0357922 | A1 * | 12/2015 | Lai | H02M 3/33592 363/21.02 |

FOREIGN PATENT DOCUMENTS

| | | |
|---|---|---|
| DE | 100 60 766 A1 | 6/2002 |
| JP | 10-505218 A | 5/1998 |
| JP | H10-511836 A | 11/1998 |
| JP | 2002-325464 A | 11/2002 |
| JP | 2004-023881 A | 1/2004 |
| JP | 2009-219311 A | 9/2009 |
| WO | 01/084699 A1 | 11/2001 |
| WO | 2013/125004 A1 | 8/2013 |

OTHER PUBLICATIONS

International Search Report dated Apr. 8, 2014, issued in counterpart International Application No. PCT/JP2013/084821 (2 pages).
Written Opinion of the International Searching Authority dated Apr. 8, 2014, issued in counterpart International Application No. PCT/JP2013/084821, w/ English translation (9 pages).
Search Report dated Oct. 19, 2015, issued in counterpart Taiwanese Patent Application No. 103105208 (2 pages).
Monteiro, Raul D. et al., "Design Principles of a Soft-Switching Cell Usable in Bridge DC-DC and DC-AC Converters", Power Elecctronics Specialists Conference; vol. 4, Jun. 23, 2002 (pp. 1861-1866).
Extended (Supplementary) Search Report dated Jan. 3, 2017, issued in European Application No. 13892232.3 (7 pages).

* cited by examiner

SMOOTHING  AUXILIARY  RESONANT  INVERTER
CIRCUIT    SWITCHING CAPACITOR BRIDGE
           CIRCUIT             CIRCUIT

MODE 1 → 2

MODE 2

MODE 3

FIG. 20

| MODE | QA | DA | Vc2 | QU QY | DU DY | Qv Qx | Dv Dx | Resonance Current | Current | L-Current Direction |
|---|---|---|---|---|---|---|---|---|---|---|
| MODE 1 | ON | - | Vc2 = Vc1 (Source voltage) | ON | - | OFF | - | - | Supply current | Supply direction |
| MODE 1 → 2 | ZVS ON↓ OFF | - | Vc2 = Vc1 Start voltage drop | ON | - | OFF | - | - | Discharge | Supply direction |
| MODE 2 | OFF | - | Vc2 = 0 | ON | - | OFF | Conduction | Discharge | - | Supply direction |
| MODE 2 → 3 | OFF | - | Vc2 = 0 | ZVS ON↓ OFF | - | OFF | Conduction | Invert | - | Supply direction |
| MODE 3 | OFF | - | Voltage rise | OFF | - | OFF | Conduction | Charge | - | Supply direction |
| MODE 3 → 4 | OFF | - | Voltage rise | OFF | - | ZVS ZCS OFF ↓ ON | Conduction | Charge | - | Supply direction |
| MODE 4 | OFF | Conduction | Vc2 = Vc1 | OFF | - | ON | Conduction | - | Regenerative current | Supply direction |
| MODE 4 → 5 | ZVS ZCS OFF ↓ ON | Conduction | Vc2 = Vc1 | OFF | - | ON | Conduction | - | Regenerative current | Supply direction |
| MODE 5 | ON | Conduction | Vc2 = Vc1 | OFF | - | ON | - | - | Regenerative current | Supply direction ↓ Source direction |

FIG. 21

| MODE | QA | DA | Vc2 | QU QY | DU DY | Qv Qx | Dv Dx | Resonance Current | Current | L-Current Direction |
|---|---|---|---|---|---|---|---|---|---|---|
| MODE 6 | ON | - | Vc2 = Vc1 | OFF | - | ON | - | - | Supply current | Source direction |
| MODE 6 → 7 | ZVS ON↓ OFF | - | Vc2 = Vc1 Start voltage drop | OFF | - | ON | - | - | - | Source direction |
| MODE 7 | OFF | - | Voltage drop | OFF | - | ON | - | Discharge | - | Source direction |
| MODE 7 → 8 | OFF | - | Vc2 = 0 | OFF | Conduction | ZVS ON↓ OFF | - | Invert | - | Source direction |
| MODE 8 | OFF | - | Vc2 = 0 | OFF | - | OFF | - | Charge | - | Source direction |
| MODE 8 → 9 | OFF | - | Vc2 = 0 | ZVS ZCS OFF↓ ON | Conduction | OFF | - | Charge | - | Source direction |
| MODE 9 | OFF | Conduction | Vc2 = Vc1 | ON | Conduction | OFF | - | - | Regenerative current | Source direction |
| MODE 9 → 10 | ZVS ZCS OFF↓ON | Conduction | Vc2 = Vc1 | ON | Conduction | OFF | - | - | Regenerative current | Source direction |
| MODE 10 | ON | Conduction | Vc2 = Vc1 | ON | - | OFF | - | - | Regenerative current | Source direction ↓ Supply direction |

SINGLE-PHASE INVERTER

TECHNICAL FIELD

The present invention relates to a single phase inverter that is usable as a power source to supply current to a load, such as a plasma load.

BACKGROUND ART

As an inverter to convert DC power to AC power, a voltage source inverter and a current source inverter are well known. The voltage source inverter performs switching by a solid state switch, between a load and a DC voltage source, thereby supplying a square wave alternating current to the load, functioning as the voltage source.

As one configuration of the inverter, there is known a circuit configuration that an arm of abridge circuit is formed with an inverse-parallel connection between a switching element such as a transistor and a thyristor, and a feedback diode, and PWM control is applied to each switching element, whereby DC-AC conversion is performed.

FIG. 19 is a circuit diagram for describing a general configuration of the single phase inverter circuit. As shown in FIG. 19A, in the single phase inverter, a circuit element formed with the switching element $Q_1$ and the feedback diode $D_1$ being inverse-parallel connected, and a circuit element formed with the switching element $Q_2$ and the feedback diode $D_2$ being inverse-parallel connected, are connected in series, thereby establishing one set of upper and lower arms of the bridge circuit. In addition, a circuit element formed with the switching element $Q_3$ and the feedback diode $D_3$ being inverse-parallel connected, and a circuit element formed with the switching element $Q_4$ and the feedback diode $D_4$ being inverse-parallel connected, are connected in series, thereby establishing another set of upper and lower arms of the bridge circuit. Here, the upper arms of the bridge circuit are connected to a positive terminal, and the lower arms are connected to a negative terminal. A connection point between one set of the upper and lower arms (the switching element $Q_1$ and the feedback diode $D_1$, and the switching element $Q_2$ and the feedback diode $D_2$), and a connection point between another set of the upper and lower arms (the switching element $Q_3$ and the feedback diode $D_3$, and the switching element $Q_4$ and the feedback diode $D_4$) are connected to the load.

The switching elements $Q_1$ and $Q_4$ are driven by a base signal (in the upper part of FIG. 19B), and the switching elements $Q_2$ and $Q_3$ are driven by another base signal (in the lower part of FIG. 19B). Those base signals are in opposite phase with each other, so as to change the direction of the current passing through the bridge circuit, thereby inverting the output voltage (FIG. 19C) and outputting AC current (FIG. 19D). It is to be noted that $Q_1$ to $Q_4$ in FIG. 19D, and $D_1$ to $D_4$ represent devices (switching elements and feedback diodes) through which the output current passes in the bridge circuit. Dead time Td in FIG. 19B is provided to prevent a short-circuit between the upper and the lower arms in the bridge circuit, when the base signal is switched.

There is suggested a configuration that employs soft switching (zero voltage switching (ZVS) and zero current switching (ZCS)) for the switching elements constituting the inverter circuit, so as to reduce switching loss, in performing on and off operations by the switching elements.

A resonance type inverter including a three-phase bridge circuit is known as a soft switching inverter for reducing switching loss. In the resonance type inverter, a commutation diode and a resonant capacitor are connected in parallel with a switching element, and a resonance circuit is configured by the resonant capacitor, a resonant inductor, and the switching element connected to the resonance circuit. Charging and discharging of the resonant capacitor by means of a resonant current of the resonance circuit and conduction of the commutation diode implement zero voltage switching (ZVS) and zero current switching (ZCS) of the switching elements (see the Patent Document 1, for example).

Since the resonance circuit has a configuration that the switching element is connected to the resonant capacitor in parallel, there is a problem that capacitance of the capacitor may increase. In order to solve the problem, there is suggested a configuration where the resonance circuit is formed with an auxiliary circuit including an auxiliary switching element (Patent Document 2).

It is suggested that also in an inverter circuit including a single-phase bridge circuit, an auxiliary circuit is provided in addition to the inverter circuit, so as to perform soft switching (Patent Documents 3 and 4).

In the Patent Document 3, it is described that the first main switch and the second main switch connected in series, are connected in parallel with a diode and a snubber capacitor, the first auxiliary resonance circuit including the first auxiliary switch and the second auxiliary switch being connected in series, and the resonant inductor, is connected to a DC power source, voltage signals of the voltages respectively across the main switches and the auxiliary switches are inputted, and it is controlled such that a turn-on signal as a switching signal is given to the first and the second auxiliary switches, prior to giving the turn-on signal to the first main switch.

In the Patent Document 4, it is described that there is provided an auxiliary circuit for soft switching, including the first to the fourth auxiliary switches, the first to the fourth auxiliary diodes, the first and the second capacitors, and a resonance reactor, and an auxiliary switch control circuit performs on and off control of the auxiliary switches, thereby forming either the first resonance current path including the first auxiliary capacitor, the first auxiliary switch, the resonance reactor, and the fourth auxiliary switch, or the second resonance current path including the second auxiliary capacitor, the second auxiliary switch, the resonance reactor, and the third auxiliary switch.

PRIOR ART DOCUMENT

Patent Document

Patent Document 1
Japanese Unexamined Patent Application Publication No. 2002-325464
Patent Document 2
Japanese Unexamined Patent Application Publication No. 2004-23881
Patent Document 3
WO01/084699
Patent Document 4
Japanese Unexamined Patent Application Publication No. 2009-219311

DISCLOSURE OF THE INVENTION

Problem to be Solved by the Invention

In the case of a resonance type inverter, there is a problem that it is necessary to connect the resonant capacitor with the switching element in parallel.

Further in the configuration where soft switching is implemented by providing the auxiliary circuit in the single phase bridge circuit, there is a problem that plural auxiliary switches and auxiliary capacitors are required to configure the auxiliary circuit.

Therefore, in the inverter circuit being conventionally known, there is a problem that plural elements are necessary to perform the soft switching, including the resonant capacitor, the auxiliary switch, the auxiliary capacitor, and the like.

An object of the present invention is to solve the aforementioned conventional problems, and perform the soft switching by a simple configuration in the inverter circuit, particularly in the single phase inverter, thereby preventing switching loss of the switching element.

Means to Solve the Problem

In the present invention, a resonance circuit is configured by a resonant capacitor provided on the power supply side of a bridge circuit, and a resonant inductor provided on the output side of the bridge circuit constituting a single phase inverter, and the bridge circuit. A resonance current passing through the resonance circuit allows zero voltage switching (ZVS) and zero current switching (ZCS) to be implemented at a rising time of main switching elements constituting the bridge circuit, and the zero voltage switching is implemented by means of zero voltage of the resonant capacitor, at a falling time of the main switching elements constituting the bridge circuit.

In addition, the single phase inverter of the present invention is provided with an auxiliary switching circuit that electrically separates from the power supply side, the circuit configuration of and subsequent to the resonant capacitor, in order to form the resonance circuit. Also in an auxiliary switching element provided in the auxiliary switching circuit, charging of the resonant capacitor with the resonance current makes a voltage of the resonant capacitor to become equal to a voltage on the power supply side, and accordingly the voltage across the auxiliary switching element becomes zero voltage, allowing the zero voltage switching to be implemented.

The single phase inverter of the present invention is provided with the bridge circuit, a smoothing circuit, the auxiliary switching circuit, the resonant capacitor, and the resonant inductor, and the bridge circuit has a configuration that a series connection between the first and the second main switching elements and a series connection between the third and the fourth main switching elements are connected in parallel with respect to a DC power source, and each of the main switching elements is connected to a diode, being reverse-biased with respect to the DC power source.

The smoothing circuit, the auxiliary switching circuit, and the resonant capacitor are connected between the DC power source and the bridge circuit, in that order from the DC power source side. The resonant inductor is connected between the connection point of the first main switching element and the second main switching element, and the connection point of the third main switching element and the fourth main switching element in the bridge circuit. Open-operation by the auxiliary switching circuit disconnects the smoothing circuit from the resonant capacitor, thereby electrically separating from the power supply side, the circuit configuration of and subsequent to the resonant capacitor. The circuit from the resonant capacitor is separated from the power supply side, and therefore this forms the resonance circuit including the resonant capacitor, the resonant inductor, and the bridge circuit.

(Soft Switching by Main Switching Element)

A switching operation by the main switching element is defined as the following:

a) In the switching operation where the main switching element is switched from the off-state to the on-state, passing of the resonance current through the resonance circuit makes the voltage across the main switching element to zero voltage, achieving zero voltage switching for the switching operation, and passing of the resonance current of the resonance circuit through the diode connected in parallel with the main switching element achieves zero current switching for the switching operation by the main switching element; and b) in the switching operation where the main switching element is switched from the on-state to the off-state, discharging of the resonant capacitor with the resonance current passing through the main switching element in the on-state, makes the voltage across the main switching element to become zero voltage, thereby achieving the zero voltage switching for the switching operation by the main switching element.

Soft switching by the main switching element employs the zero voltage switching and the zero current switching for the switching operation to perform switching from the off-state to the on-state, whereas the zero voltage switching is employed in the switching operation from the on-state to the off-state.

(Soft Switching by the Auxiliary Switching Element)

In the single phase inverter of the present invention, it is further possible to configure such that the smoothing circuit is provided with a smoothing capacitor being connected between the positive side and the negative side of the DC power source, the resonant capacitor is provided with a resonant capacitor being connected between the positive side and the negative side of the DC power source, and the auxiliary switching circuit is provided with the auxiliary switching element that opens and closes the connection between the smoothing capacitor and the resonant capacitor, and the diode being connected with the auxiliary switching element in parallel.

The auxiliary switching circuit disconnects the smoothing capacitor from the resonant capacitor, thereby configuring the resonance circuit that includes the resonant capacitor, the resonant inductor, and the bridge circuit.

The switching operation by the auxiliary switching element is defined as the following:

a) In the switching operation where the auxiliary switching element is switched from the on-state to the off-state, flowing of a supply current from the DC power source toward the load side makes the voltage of the resonant capacitor to become equal to the voltage of the smoothing capacitor. Accordingly, the voltage across the auxiliary switching element becomes zero voltage, achieving the zero voltage switching for the switching operation; and b) in the switching operation to switch the auxiliary switching element from the off-state to the on-state, charging of the resonant capacitor with the current passing through the resonance circuit makes the voltage of the resonant capacitor to be equal to the voltage of the smoothing capacitor, achieving the zero voltage switching for the switching operation. In addition, charging of the resonant capacitor brings the diode connected in parallel with the auxiliary switching element into conduction, allowing a regenerative current to pass through the diode from the load side toward the DC power source, thereby achieving the zero current switching for the switching operation.

The soft switching by the auxiliary switching element implements the zero voltage switching for the switching operation from the on-state to the off-state, and implements the zero current switching and the zero voltage switching for the switching operation from the off-state to the on-state.

The resonant inductor constituting the resonance circuit may be configured by an inductor element connected between the bridge circuit and the load, and an inductive component of the load.

In the case where the resonant inductor is configured by includes the inductor element, a current path is formed between the mid-point of the upper and lower arms in the bridge circuit and the load, via the inductor element, so as to supply an output current to the load.

According to the present invention, the resonance circuit to perform the soft switching operation may be configured by the resonant capacitor, the resonant inductor, and the bridge circuit, and the circuit configuration of the resonance circuit may be formed with the smoothing circuit and the auxiliary switching circuit, achieving a simple circuit configuration. In addition, the resonant capacitor and the smoothing capacitor may be configured by one capacitor element, and also the auxiliary switching circuit may be formed with only one switching element, and therefore it is possible to reduce the number of elements required for the circuit.

Effect of the Invention

As described so far, according to the single phase inverter of the present invention, it is possible to perform the soft switching with a simple configuration, and prevent switching loss in the switching element.

BRIEF DESCRIPTION OF DRAWINGS

FIG. 20 is a table showing operation modes 1-5 of the single phase inverter according to the present invention; and FIG. 21 is a table showing operation modes 6-10 of the single phase inverter according to the present invention.

MODE FOR CARRYING OUT THE INVENTION

Figure 1A:
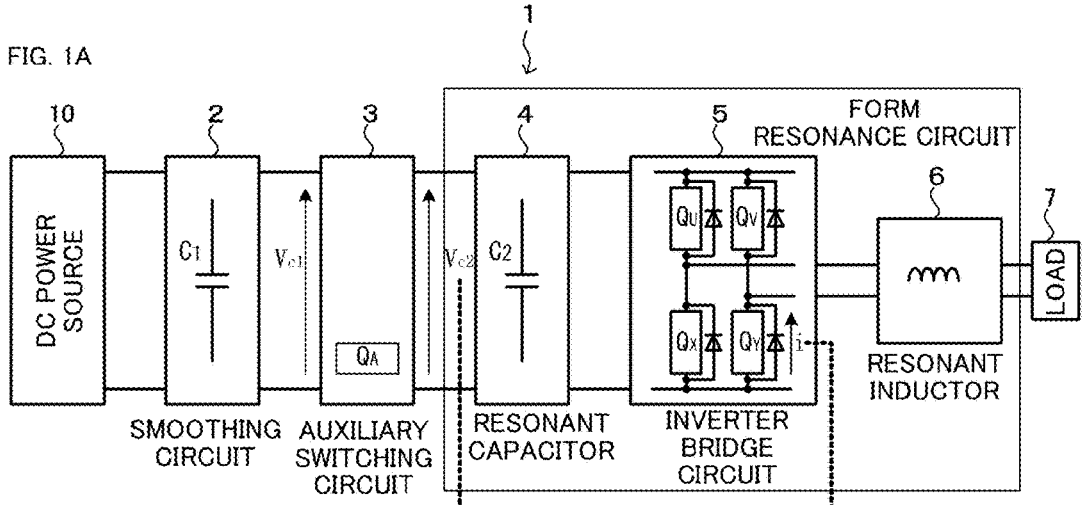
FIG. 1 illustrates a schematic configuration example of a single phase inverter according to the present invention.

A preferred embodiment of the present invention will be described in detail below, with reference to the accompanying drawings. In the following, the single phase inverter of the present invention will be described. With reference to FIG. 1 and FIG. 2, a schematic configuration example of the single phase inverter of the present invention will be described, with reference to FIG. 3, a circuit configuration example of the single phase inverter of the present invention will be described, with reference to FIG. 4 to FIG. 16, operation examples of the single phase inverter of the present invention will be described, and a configuration example of a power supply device for plasma, using the single phase inverter of the present invention, will be described with reference to FIG. 17 and FIG. 18.

[Configuration Example of the Single Phase Inverter]

Firstly, with reference to FIG. 1 and FIG. 2, a schematic configuration example of the single phase inverter of the present invention will be described. FIG. 2 illustrates an example using a resonant inductor.

In FIG. 1, the single phase inverter 1 of the present invention is provided with the smoothing circuit 2, the auxiliary switching circuit 3, the resonant capacitor 4, the bridge circuit 5, and the resonant inductor 6, the single phase inverter converting DC from the DC power source 10 to AC and supplying the AC output being converted to the load 7. The smoothing circuit 2, the auxiliary switching circuit 3, and the resonant capacitor 4 are connected in this order from the DC power source 10 side, between the DC power source 10 and the bridge circuit 5. In the single phase inverter of the present invention, the resonant capacitor 4, the bridge circuit 5, and the resonant inductor 6 constitute the resonance circuit.

Open operation in the auxiliary switching circuit 3 disconnects the smoothing circuit 2 from the resonant capacitor 4, and electrically separates from the power supply side, the bridge circuit 5 and the resonant inductor 6 corresponding to the circuit configuration from the resonant capacitor 4. By separating the resonant capacitor 4, the bridge circuit 5, and the resonant inductor 6 from the power supply side, the resonance circuit is formed. According to the present invention, the switching operations of the main switching elements ($Q_U$, $Q_X$, $Q_V$, $Q_Y$) constituting the bridge circuit 5 and the auxiliary switching element ($Q_A$) are performed switching by soft switching, by using the resonance current in the resonance circuit and zero voltage of the capacitor voltage in the resonant capacitor.

Figure 1B:
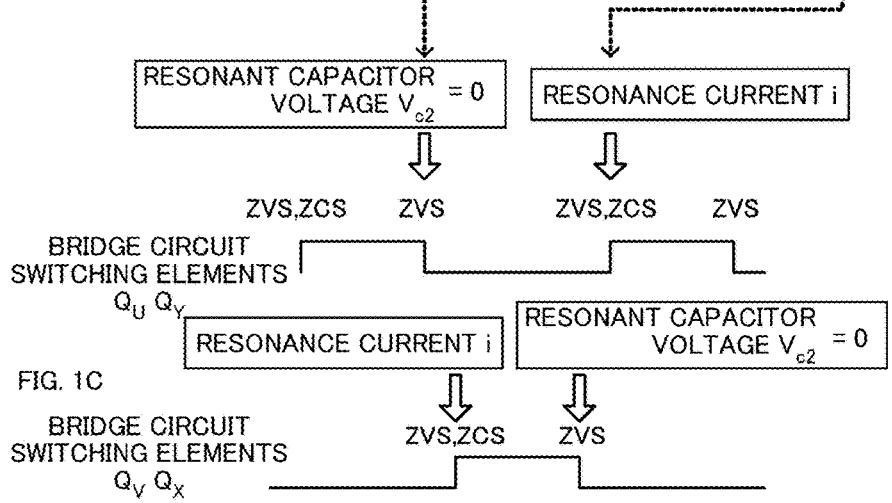
Figure 1C:
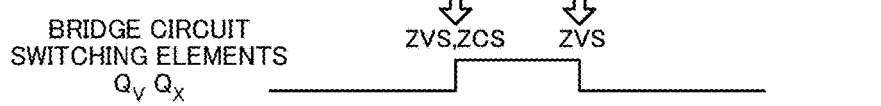
Figure 2:
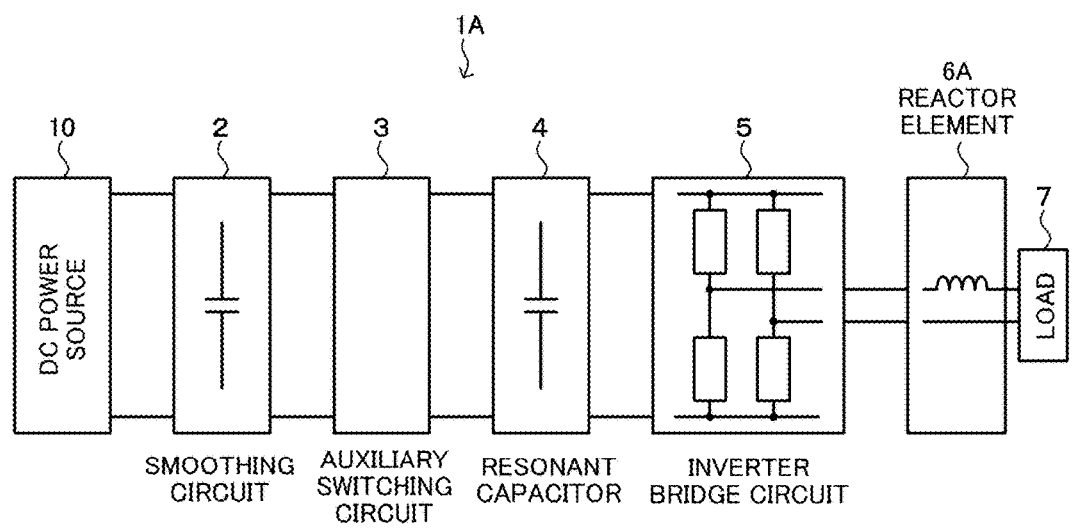
FIG. 2 illustrates a schematic configuration example of the single phase inverter according to the present invention.

FIG. 1B and FIG. 1C illustrate the soft switching of the main switching elements in the bridge circuit.

FIG. 1B illustrates the soft switching of the main switching elements $Q_U$ and $Q_Y$ constituting one of the arms in the bridge circuit 5.

When the main switching elements $Q_U$ and $Q_Y$ are switched from the off-state to the on-state, charging or discharging of the resonant capacitor with the resonance current is performed, and the voltage $V_{c2}$ of the resonant capacitor is in the state of zero voltage. Therefore, the switching operation at this point allows zero voltage switching to be implemented. Since the resonance current passes through the diodes $D_U$ and $D_Y$ that are connected in parallel with the main switching elements $Q_U$ and $Q_Y$ being reverse-biased, the switching operation at this point allows the zero current switching to be implemented.

On the other hand, when the main switching elements $Q_U$ and $Q_Y$ are switched from the on-state to the off-state, the resonant capacitor releases an electric charge having been accumulated through the resonance circuit. The switching operation in the state where the voltage $V_{c2}$ in the resonant capacitor becomes zero, allows the zero voltage switching to be implemented.

FIG. 1C illustrates the soft switching of the main switching elements $Q_V$ and $Q_X$ constituting the other arm in the bridge circuit 5.

Soft switching of the main switching elements $Q_V$ and $Q_X$ is performed in the same manner as the soft switching of the main switching elements $Q_U$ and $Q_Y$.

When the main switching elements $Q_V$ and $Q_X$ are switched from the off-state to the on-state, the resonant capacitor is charged with the resonance current or discharged, and the voltage $V_{c2}$ of the resonant capacitor is in the state of zero voltage. Therefore, the switching operation at this point allows the zero voltage switching to be implemented. Since the resonance current passes through the diodes $D_V$ and $D_X$ that are connected in parallel with the main switching elements $Q_V$ and $Q_X$ being reverse-biased, the switching operation at this point allows the zero current switching to be implemented.

On the other hand, when the main switching elements $Q_V$ and $Q_X$ are switched from the on-state to the off-state, the resonant capacitor releases an electric charge having been accumulated through the resonance circuit. The switching operation in the state where the voltage $V_{c2}$ in the resonant capacitor becomes zero voltage, allows the zero voltage switching to be implemented.

Figure 1D:
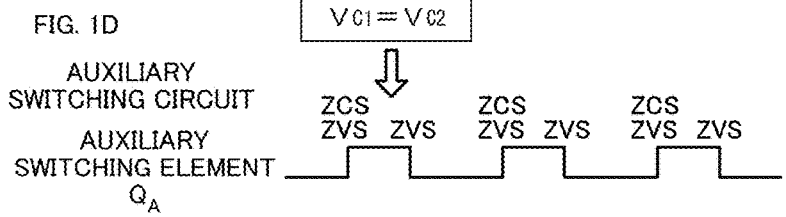

FIG. 1D illustrates the soft switching of the auxiliary switching element $Q_A$ in the auxiliary switching circuit 3.

In the switching operation by the auxiliary switching element, when the auxiliary switching element is switched from the on-state to the off-state, a supply current passing from the DC power source toward the load side makes, the voltage of the resonant capacitor become equal to the voltage of the smoothing capacitor, and makes a potential difference across the auxiliary switching element become zero voltage. This allows the zero voltage switching to be implemented for the switching operation.

On the other hand, in the switching operation where the auxiliary switching element is switched from the off-state to the on-state, charging the resonant capacitor with the current passing through the resonance circuit makes the voltage of the resonant capacitor to be equal to the voltage of the smoothing capacitor. This allows the zero voltage switching to be implemented for the switching operation.

In addition, charging the resonant capacitor brings the diode into conduction, the diode being connected in parallel with the auxiliary switching element, and a regenerative current passes through the diode from the load side toward the DC power source.

This allows the zero current switching to be implemented for the switching operation by the auxiliary switching element.

Accordingly, the soft switching of the auxiliary switching element implements the zero voltage switching for the switching operation from the on-state to the off-state, and implements the zero current switching and the zero voltage switching for the switching operation from the off-state to the on-state.

FIG. 2 illustrates a configuration example of the resonant inductor in the single phase inverter. In the configuration example as shown in FIG. 2, a reactor element 6A is inserted between the output end of the bridge circuit 5 and the load 7, and the reactor element 6A constitutes the resonant inductor 6. With this configuration example, even in the case where the load is a capacitive load, it is possible to establish the resonance circuit in the single phase inverter of the present invention.

[Circuit Configuration Example of the Single Phase Inverter]

FIG. 3 illustrates a circuit diagram showing one circuit configuration example of the single phase inverter 1 according to the present invention. The capacitor $C_1$ and the capacitor $C_2$, connected in parallel between the positive and negative output ends of the DC power source 10, respectively form the smoothing circuit 2 and the resonant capacitor 4.

The auxiliary switching circuit 3 is configured by the auxiliary switching element $Q_A$ connected between the positive end of the capacitor $C_1$ and the positive end of the capacitor $C_2$, or between the negative end of the capacitor $C_1$ and the negative end of the capacitor $C_2$, and the diode $D_A$ connected in parallel with the auxiliary switching element $Q_A$.

Figure 3A:
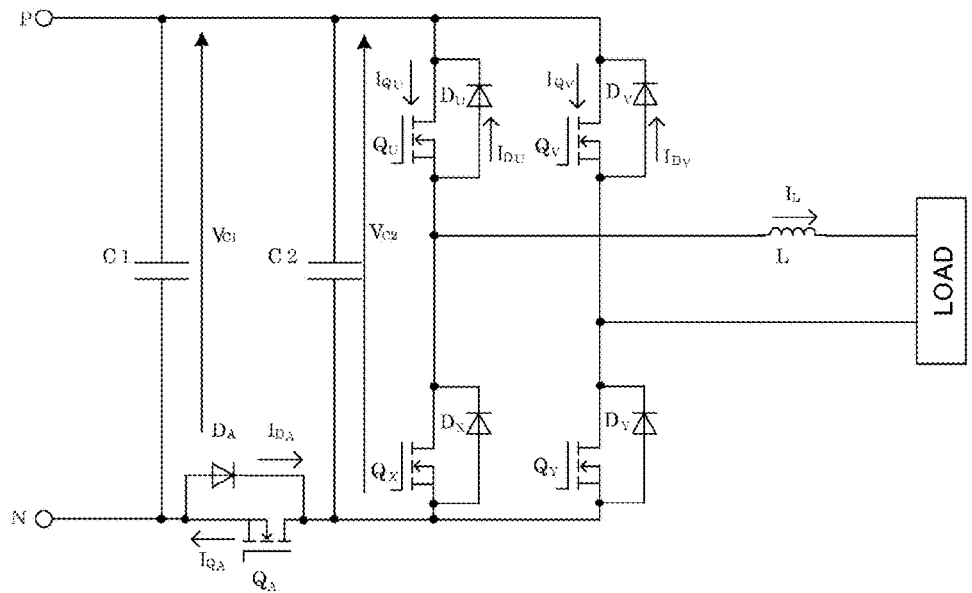
FIG. 3 illustrates circuit configuration examples of the single phase inverter according to the present invention.

FIG. 3A illustrates a configuration example that the auxiliary switching element $Q_A$ and the diode $D_A$ are provided between the negative end of the capacitor $C_1$ and the negative end of the capacitor $C_2$. The auxiliary switching element $Q_A$ is connected in the direction along which the current $I_{QA}$ passes toward the DC power source 10 side from the bridge circuit 5 side, and the diode $D_A$ is connected in the direction along which the current $I_{DA}$ passes toward the bridge circuit 5 side from the DC power source 10 side.

Figure 3B:
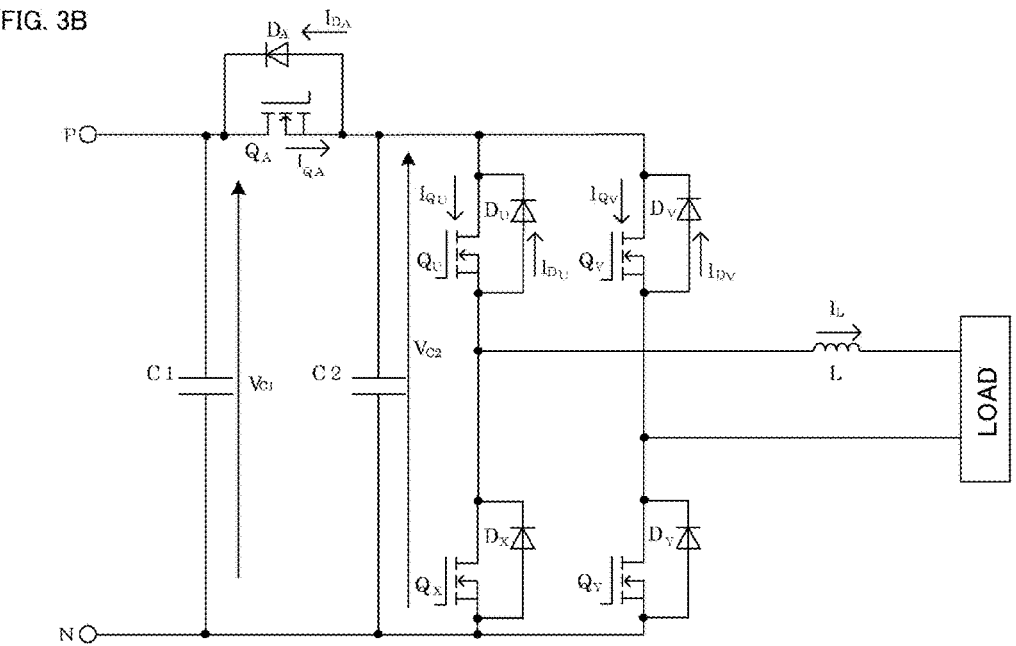

FIG. 3B illustrates a configuration example that the auxiliary switching element $Q_A$ and the diode $D_A$ are provided between the positive end of the capacitor $C_1$ and the positive end of the capacitor $C_2$. The auxiliary switching element $Q_A$ is connected in the direction along which the current $I_{QA}$ passes toward the bridge circuit 5 from the DC power source 10 side, and the diode $D_A$ is connected in the direction along which the current $I_{DA}$ passes toward the DC power source 10 side from bridge circuit 5 side.

DC voltage $E_d$ from the DC power source 10 is applied between input terminals of the capacitor $C_1$, and the voltage $V_{c1}$ across the capacitor $C_1$ becomes $E_d$. On the other hand, the voltage $V_{c2}$ across the capacitor $C_2$ is $E_d$ while the auxiliary switching circuit 3 is closed and remains in the conductive state. When the auxiliary switching circuit 3 is opened and goes into a non-conductive state, the capacitor $C_1$ performs discharging, and these performances make the voltage $V_{c2}$ to be reduced to be lower than $E_d$.

The series connection between the first and the second main switching elements $Q_U$ and $Q_X$, and the series connection between the third and the fourth main switching elements $Q_V$ and $Q_Y$ are connected in parallel with respect to positive voltage and negative voltage of the DC power source 10, thereby constituting the bridge circuit 5. Each of the main switching elements $Q_U$, $Q_X$, $Q_V$, and $Q_Y$ are respectively connected in parallel with the diodes $D_U$, $D_X$, $D_V$, $D_Y$ being reverse-biased with respect to the voltage direction of the DC power source 10.

In FIG. 3, the resonance reactor L constitutes the resonant inductor 6. The inductor current $I_L$ passing through the resonance reactor L becomes an output current when it is supplied to the load, and when returning to the power supply side from the load, the current becomes a regenerative current. When the resonance circuit is formed, the current becomes a resonance current.

In the switching operation by the main switching elements, soft switching of the zero voltage switching (ZVS) and/or the zero current switching (ZCS) uses the resonance current that is generated by resonant operations of the resonant capacitor $C_2$ and the resonance reactor L.

In order to perform this resonant operations, according to an energy relationship that the energy $(L \times I_L^2)/2$ being accumulated in the resonance reactor L when the resonance circuit is formed, is larger than the energy $(C_2 \times V_c^2)/2$ being accumulated in the resonant capacitor $C_2$, it is necessary to satisfy the following relationship, where the voltage of the resonant operation is $V_c$, the current is $I_L$, the resonant capacitor is $C_2$, and the resonance reactor is L:

$$(C_2 \times V_c^2)/2 < (L \times I_L^2)/2 \qquad (1)$$

In addition, minimizing the wiring or pattern distance from the resonant capacitor $C_2$ to each of the main switching elements $Q_U$, $Q_X$, $Q_V$, and $Q_Y$ of the bridge circuit may reduce a resonant operation caused by wiring reactor between floating capacitance C of the switching elements and the resonant capacitor $C_2$, thereby suppressing generation of the surge voltage when the main switching elements are turned off.

Figure 4:
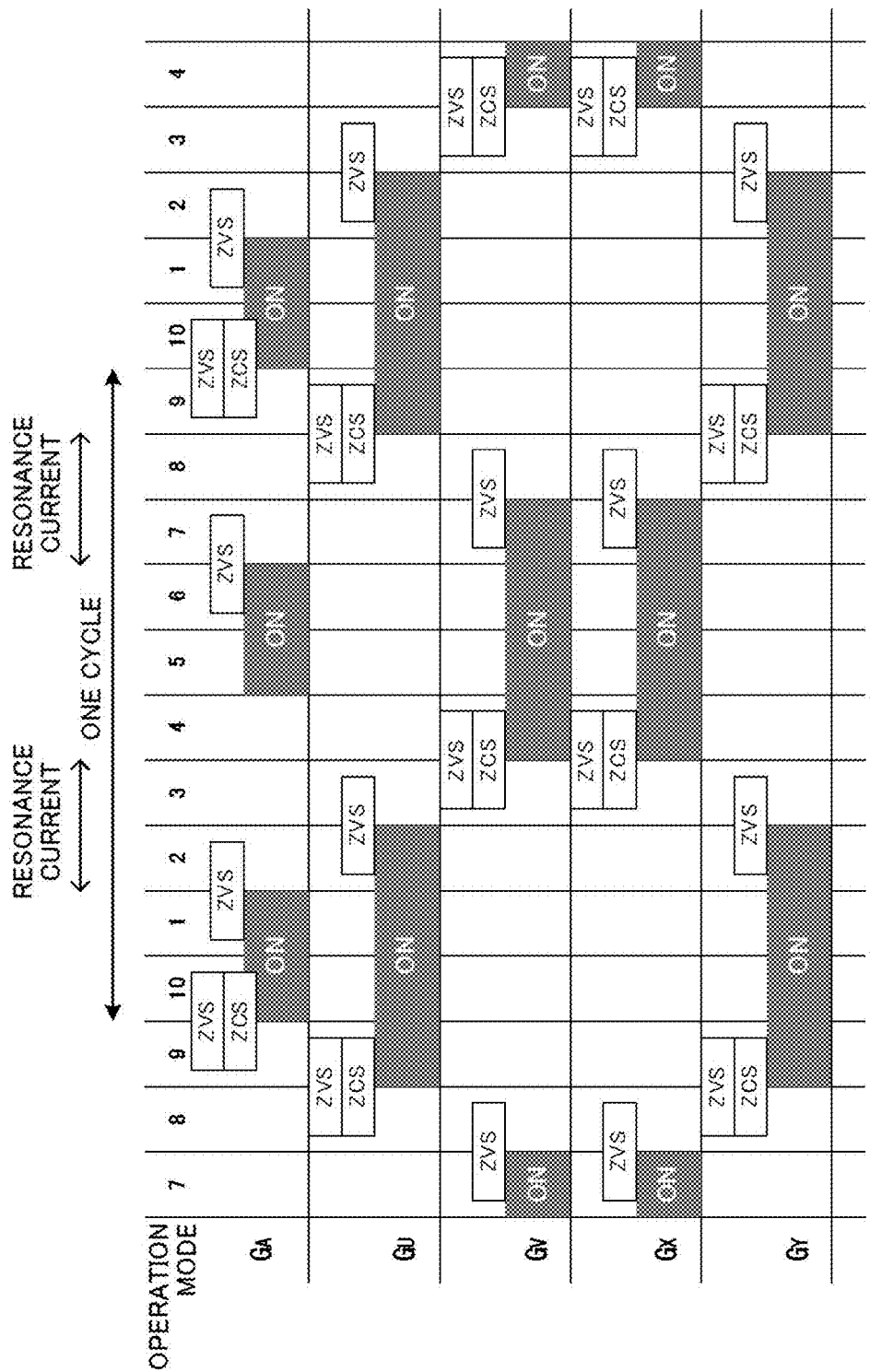
FIG. 4 is an operation diagram of switching elements for describing an operation of the single phase inverter according to the present invention.

FIG. 4 is an operation diagram of the switching elements for describing an operation of the single phase inverter. The operation diagram of FIG. 4 illustrates the signal output state in 10 stages, from operation mode 1 to operation mode 10, as to agate signal $G_A$ for driving the auxiliary switching element $Q_A$, and gate signals $G_U$, $G_V$, $G_X$, and $G_Y$ respectively for driving the main switching elements $Q_U$, $Q_V$, $Q_X$, and $Q_Y$.

The bridge circuit 5 performs DC-AC conversion according to the on-state or the off-state of the main switching elements $Q_U$, $Q_V$, $Q_X$, and $Q_Y$. A pair of the first main switching element $Q_U$ and the fourth main switching element $Q_Y$, and a pair of the second main switching element $Q_X$ and the third main switching element $Q_V$ in the bridge circuit 5 are alternately driven, thereby switching the direction of the output current toward the load, and such switching of the main switching elements may perform the DC-AC conversion.

For example, a pair of the first main switching element $Q_U$ and the fourth main switching element $Q_Y$ are turned on, and a pair of the second main switching element $Q_X$ and the third main switching element $Q_V$ are turned off (operation modes 9, 10, 1, and 2), a current passes in the direction from the connection point between the first and the second main switching elements $Q_U$ and $Q_X$ to the load 7, and from the load 7 toward the connection point between the third and the fourth main switching elements $Q_V$ and $Q_Y$.

When the phase is inverted in the driving state of the main switching elements, turning off the pair of the first main switching element $Q_U$ and the fourth main switching element $Q_Y$ and turning on the pair of the second main switching element $Q_X$ and the third main switching element $Q_V$ (operation modes 4 to 7), a current passes in the direction from the load 7 toward the connection point between the first and the second main switching elements $Q_U$ and $Q_X$, and from the connection point between the third and the fourth main switching elements $Q_V$ and $Q_Y$ toward the load 7.

When the driving state of the switching element is switched, and the pair of the first main switching element $Q_U$ and the fourth main switching element $Q_Y$ are turned off and the pair of the second main switching element $Q_X$ and the third main switching element $Q_V$ are turned on (operation modes 4, 5, 6, and 7), a current passes in the direction from the connection point between the third and the fourth main switching elements $Q_V$ and $Q_Y$ to the load 7, and from the load 7 toward the connection point between the first and the second main switching elements $Q_U$ and $Q_X$.

Between the on-state of the first main switching element $Q_U$ and the fourth main switching element $Q_Y$ (operation modes 9, 10, 1, and 2), and the on-state of the second main switching element $Q_X$ and the third main switching element $Q_V$ (operation modes 4, 5, 6, and 7), there are provided operation modes 3 and 8 to turn off all the main switching elements $Q_U$, $Q_V$, $Q_X$, and $Q_Y$, so as to prevent a short-circuit between the upper and the lower arms in the inverter circuit.

The single phase inverter of the present invention utilizes the resonance current passing through the resonance circuit including the bridge circuit, so that the switching operation by the main switching elements is performed according to the soft switching. The auxiliary switching circuit electrically separates from the DC power source 10 side, the circuit configuration of and subsequent to the resonant capacitor, and establishes the resonance circuit by the resonant capacitor, the bridge circuit, and the resonant inductor, thereby generating the resonance current.

The auxiliary switching circuit outputs the gate signal $G_A$ in the operation modes 10 and 1, and in the operation modes 5 and 6, and then turns on the auxiliary switching element $Q_A$. Those operation modes form the resonance circuit.

Duration of each zone of the operation modes 1, 2, 4, 5, 6, 7, 9, and 10 to drive the main switching elements is variable depending on a drive frequency. On the other hand, the duration of the operation modes 2 to 4 and 7 to 9, corresponding to the off-zone of the auxiliary switching element $Q_A$, and the duration of the operation modes 3 and 8 being a dead time of the main switching elements $Q_U$, $Q_V$, $Q_X$, and $Q_Y$ of the upper and lower arms, may be fixed values being set on the basis of a time constant of voltage change, or the like, being determined by a circuit element value, and the like.

[Operation Example]

Figure 5:
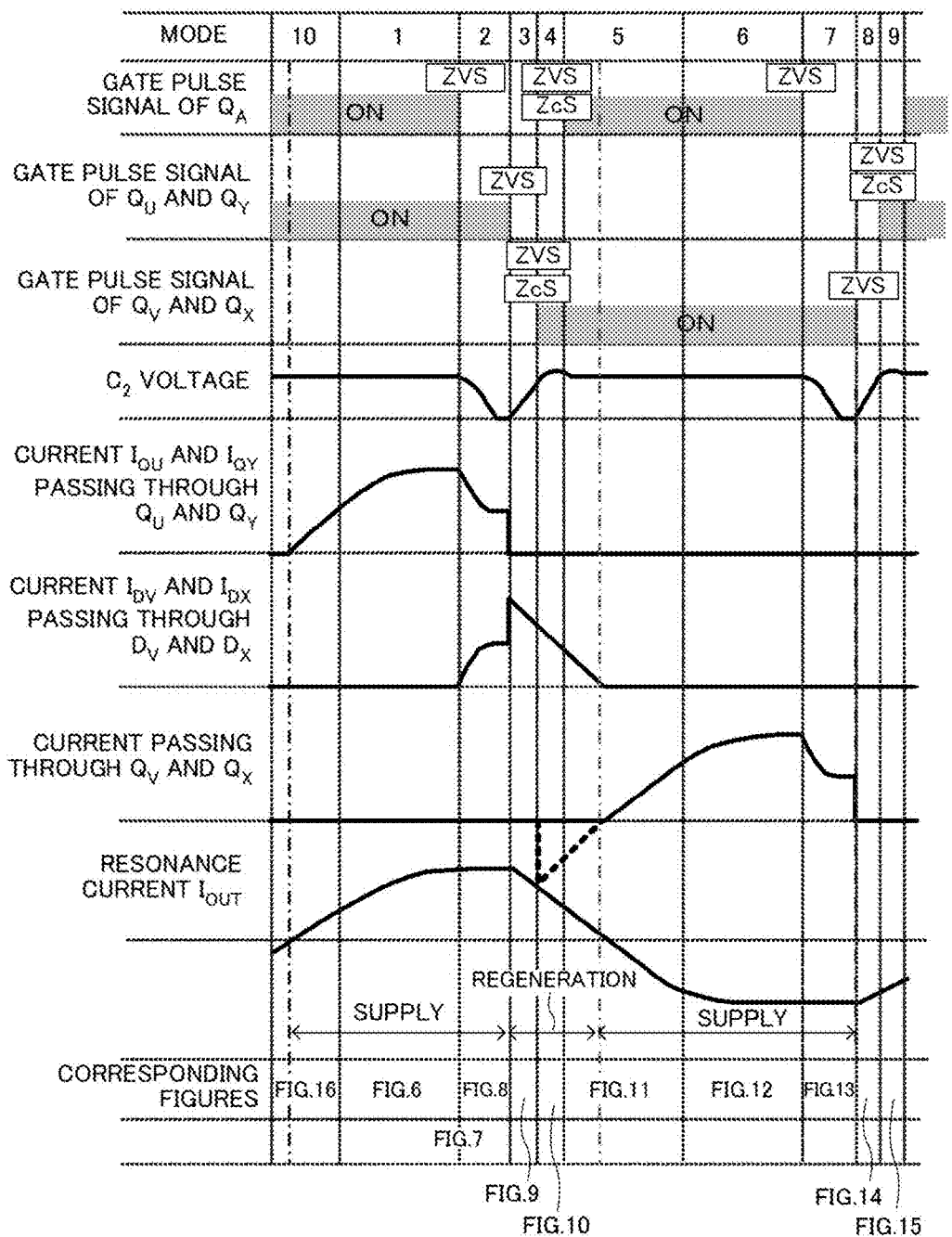
FIG. 5 illustrates a signal state of each part in the operation modes 1 to 10 for describing an operation example of the single phase inverter according to the present invention.

FIG. 5 illustrates a signal status of each part in the operation mode 1 to the operation mode 10. FIG. 5 illustrates the gate signals of the auxiliary switching element $Q_A$, the main switching elements $Q_U$, $Q_V$, $Q_X$, and $Q_Y$, the voltage $V_{c2}$ of the resonant capacitor $C_2$, the currents $I_{QU}$, $I_{QY}$, $I_{QV}$, and $I_{QX}$ passing through the main switching elements $Q_U$, $Q_Y$, $Q_V$, and $Q_X$, and the currents $I_{DV}$ and $I_{DX}$ passing through the diodes $D_V$ and $D_X$, and the resonance current $I_{out}$.

With reference to FIG. 6 to FIG. 16, the operation modes 1 to 10 will be described below.

(Operation Mode 1)

Figure 6:
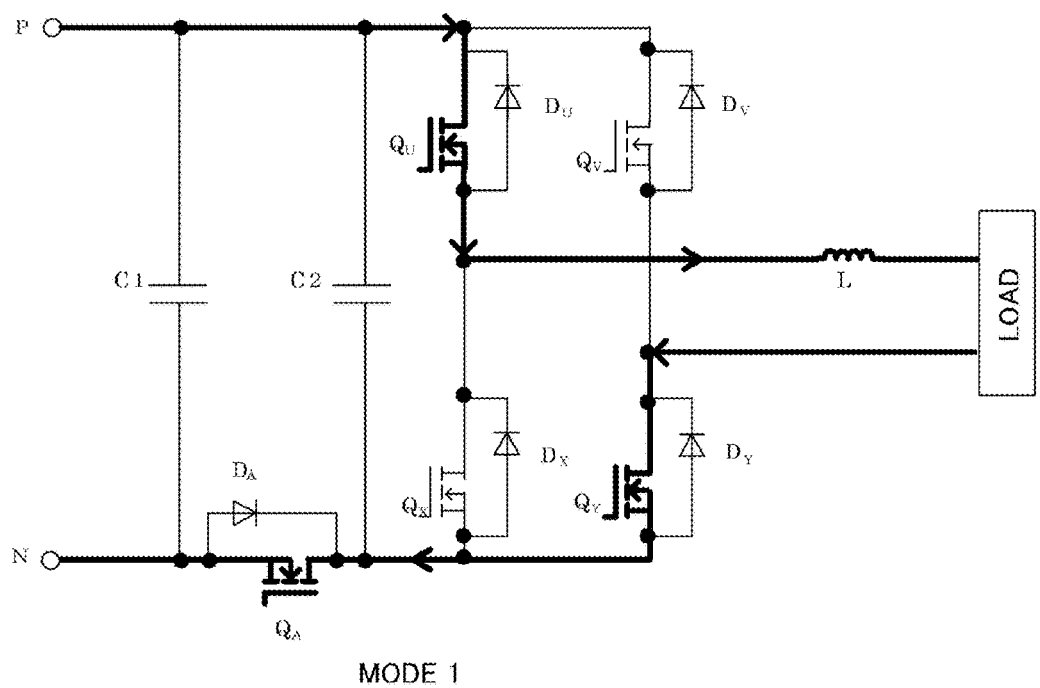
FIG. 6 is an operation diagram of the mode 1 for describing an operation example of the single phase inverter according to the present invention.

FIG. 6 illustrates the operating state of the operation mode 1. In the operation mode 1, the auxiliary switching element $Q_A$ and the main switching elements $Q_U$ and $Q_Y$ are in the on-state. In the operation mode 1, a current path is formed to pass current from the P terminal on the positive side of the DC power source, through the main switching element $Q_U$, the resonance reactor L, the main switching element $Q_Y$, and the auxiliary switching element $Q_A$, to the N terminal on the negative side of the DC power source, and the output current is supplied to the load.

(Operation Mode 1→2)

Figure 7:
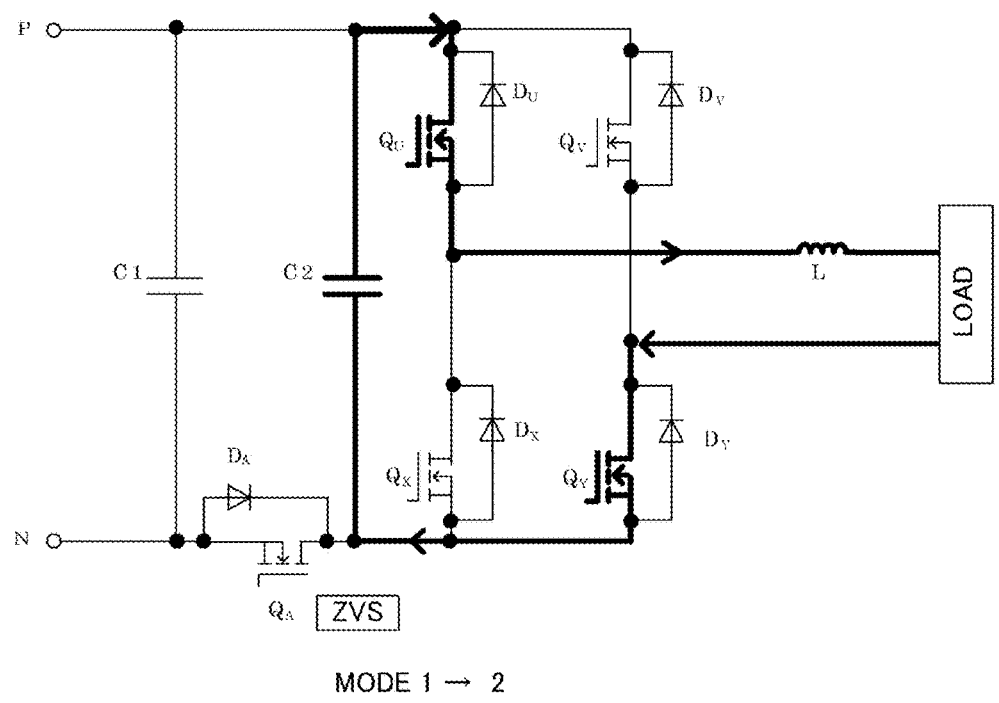
FIG. 7 is an operation diagram from the mode 1 to the mode 2 for describing an operation example of the single phase inverter according to the present invention.

FIG. 7 illustrates the operating state of the operation mode 1→2, and the operation mode 1 shifts to the operation mode 2 by switching the on-state of the auxiliary switching element $Q_A$ to the off-state.

As for the shifting from the on-state to the off-state of the auxiliary switching element $Q_A$, at the point when the auxiliary switching element $Q_A$ is turned off, the resonant capacitor $C_2$ has the same voltage as the smoothing capacitor $C_1$, and there is no potential difference between the voltage $V_{c2}$ of resonant capacitor $C_2$ and the voltage $V_{c1}$ of the smoothing capacitor $C_1$. Therefore, the voltage across the auxiliary switching element is zero. Accordingly, in this state, the switching operation by the auxiliary switching element $Q_A$ from the on-state to the off-state is the zero current switching (ZVS).

When the auxiliary switching element $Q_A$ is switched from the on-state to the off-state, discharging of the resonant capacitor $C_2$ starts from the voltage $V_{c2}$.

(Operation Mode 2)

Figure 8:
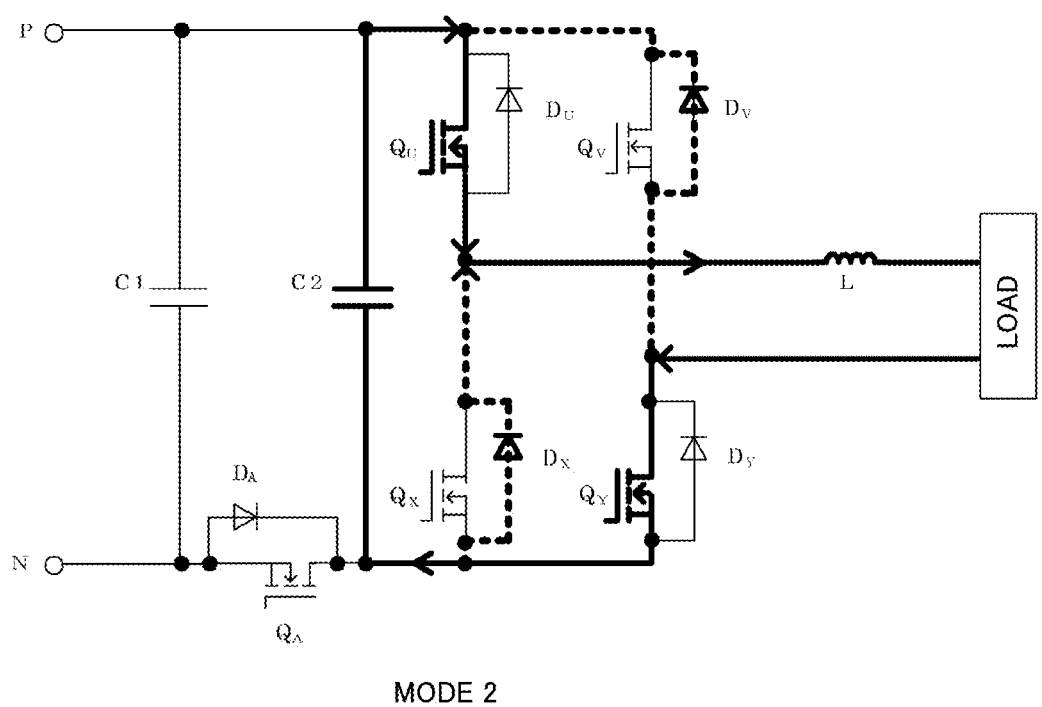
FIG. 8 is an operation diagram of the mode 2 for describing an operation example of the single phase inverter according to the present invention.

FIG. 8 illustrates the operation mode 2. At the point when the voltage $V_{c2}$ reaches zero voltage according to the discharging of the resonant capacitor $C_2$, the operation mode shifts to the operation mode 2.

In the operation mode 2, the resonant capacitor $C_2$, the bridge circuit, and the resonance reactor L are electrically separated from the DC power source side, so as to form the resonance circuit. As for the resonance current passing through the resonance circuit, the currents passing through the main switching element $Q_Y$ and the main switching element $Q_U$ are shunted by the diode $D_X$ and the diode $D_V$. The broken lines in FIG. 8 indicate the shunt.

(Operation Mode 3)

Figure 9:
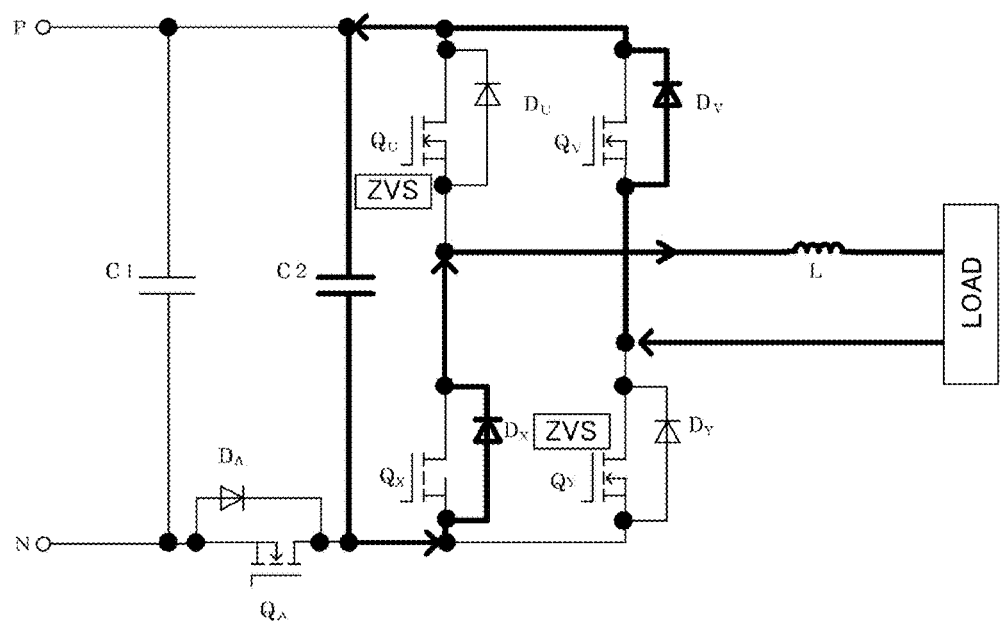
FIG. 9 is an operation diagram of the mode 3 for describing an operation example of the single phase inverter according to the present invention.

FIG. 9 illustrates the operation mode 3, showing the state where the main switching elements $Q_U$ and $Q_Y$ are switched from the on-state to the off-state. In the operation mode 2, at the point when the voltage $V_{c2}$ reaches zero voltage according to the discharging of the resonant capacitor $C_2$, the operation mode 2 shifts to the operation mode 3, and the main switching elements are switched from the on-state to the off-state.

At this point, since the voltage $V_{c2}$ of the resonant capacitor $C_2$ is zero voltage, the voltages $V_{QU}$ and $V_{QY}$ respectively across the main switching elements $Q_U$ and $Q_Y$ are zero. Therefore, at this stage, the zero voltage switching (ZVS) is implemented for the switching of the main switching elements $Q_U$ and $Q_Y$ from the on-state to the off-state.

The shift of the main switching elements $Q_U$ and $Q_Y$ to the off-state causes the currents $I_{QU}$ and $I_{QY}$ in the main switching elements $Q_U$ and $Q_Y$ to become zero. Thereafter, charging of the resonant capacitor $C_2$ starts from the zero voltage, allowing the resonance current to be inverted and pass into the diode $D_V$ and the diode $D_X$.

(Operation Mode 4)

Figure 10:
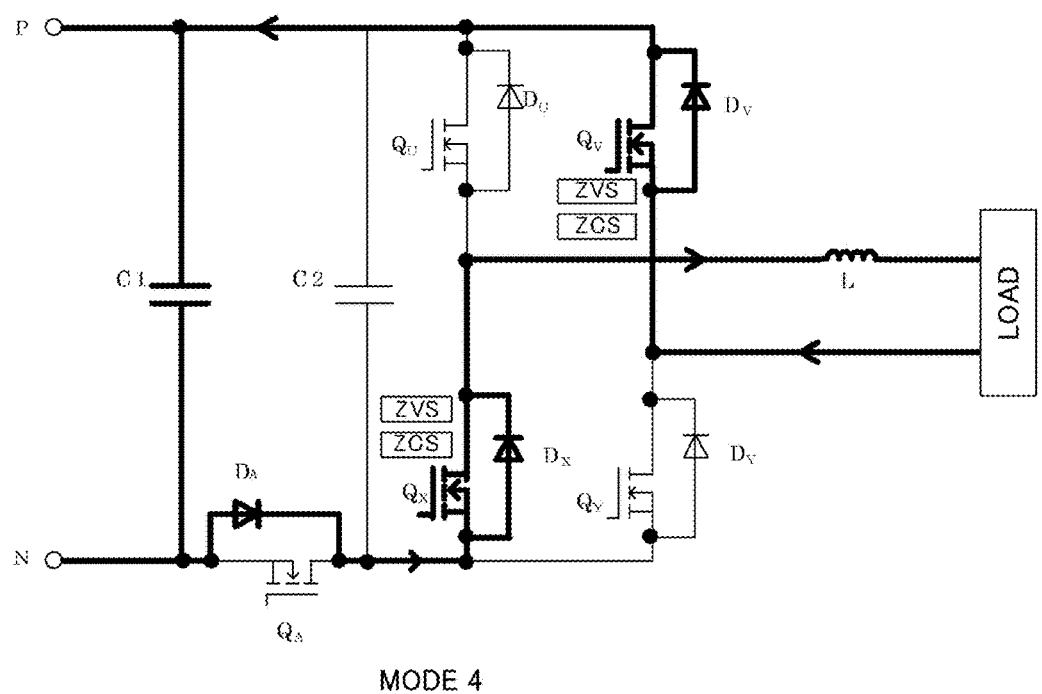
FIG. 10 is an operation diagram of the mode 4 for describing an operation example of the single phase inverter according to the present invention.

FIG. 10 illustrates the operation mode 4 showing the state where the main switching elements $Q_V$ and $Q_X$ are switched from the off-state to the on-state. In the operation mode 3, since the voltage $V_{c2}$ of the resonant capacitor $C_2$ is zero voltage, the voltages $V_{QV}$ and $V_{QX}$ respectively across the main switching elements $Q_V$ and $Q_X$ are zero. Therefore, switching of the main switching elements $Q_V$ and $Q_X$ at this point, from the off-state to the on-state, can be performed under the zero voltage switching (ZVS) condition.

Further in the operation mode 3, the diode $D_V$ and the diode $D_X$ are brought into conduction and the resonance current passes therethrough. Therefore, at this point of time, switching of the main switching elements $Q_V$ and $Q_X$ from the off-state to the on-state can be performed under the zero current switching (ZCS) condition.

In the operation mode 3, when the resonant capacitor $C_2$ is charged, and the voltage $V_{c2}$ of the resonant capacitor is increased to the level that brings the diode $D_A$ into conduction, the operation mode 3 shifts to the operation mode 4, and the diode $D_A$ is brought into conduction. If voltage drop of the diode $D_A$ is ignored, the smoothing capacitor $C_1$ has the same potential as the resonant capacitor $C_2$, and this allows a regenerative current to pass from the resonance circuit side toward the power source side.

(Operation Mode 5)

Figure 11:
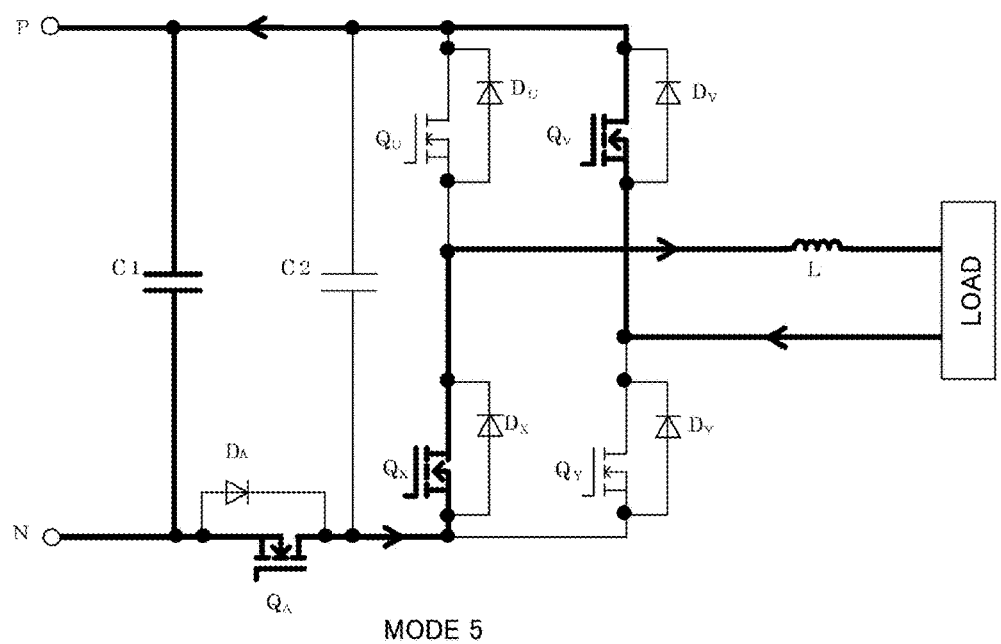
FIG. 11 is an operation diagram of the mode 5 for describing an operation example of the single phase inverter according to the present invention.

FIG. 11 illustrates the operation mode 5, showing the state where the auxiliary switching element $Q_A$ is switched from the off-state to the on-state. According to the operation mode 4, in the state where the smoothing capacitor $C_1$ and the resonant capacitor $C_2$ become the same potential, when the auxiliary switching element $Q_A$ is switched from the off-state to the on-state, this allows the zero voltage switching (ZVS) to be implemented, since the voltage across the auxiliary switching element $Q_A$ is zero voltage. Furthermore, since the regenerative current passes through the diode $D_A$, this allows the zero current switching (ZCS) to be implemented.

The aforementioned operations from the operation mode 1 to the operation mode 5 correspond to a half cycle operation, and one cycle operation may be completed when it is combined with the next half cycle from the operation mode 6 to the operation mode 10.

The operations from the operation mode 6 to the operation mode 10 are similar to the operations from the operation mode 1 to the operation mode 5, where the pair of the active main switching elements $Q_U$ and $Q_Y$ are replaced by the pair of $Q_V$ and $Q_X$.

(Operation Mode 6)

Figure 12:
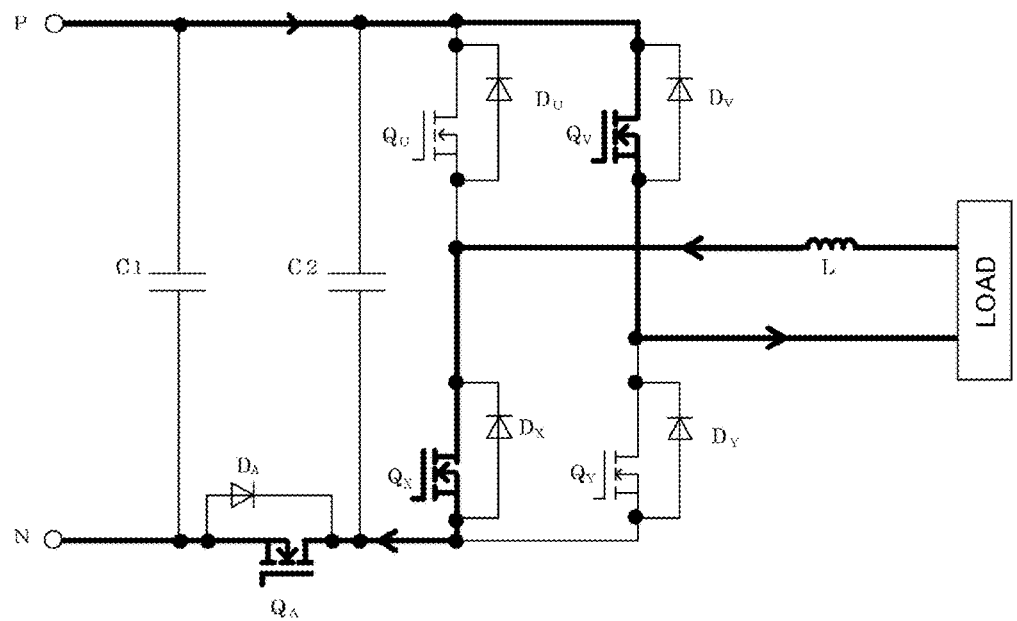
FIG. 12 is an operation diagram of the mode 6 for describing an operation example of the single phase inverter according to the present invention.

FIG. 12 illustrates an operating state of the operation mode 6. In the operation mode 6, the auxiliary switching element $Q_A$, the main switching elements $Q_V$ and $Q_X$ are in the on-state. In the operation mode 6, a path is formed for a current to pass from the P terminal on the positive side of the DC power source, via the main switching element $Q_V$, the resonance reactor L, the main switching element $Q_X$, and the auxiliary switching element $Q_A$, to the N terminal on the negative side of the DC power source, and the output current is supplied to the load.

The operation mode 6 shifts to the operation mode 7, by switching the auxiliary switching element $Q_A$ from the on-state to the off-state.

In shifting the auxiliary switching element $Q_A$ from the on-state to the off-state, at the point when the auxiliary switching element $Q_A$ is turned off, the resonant capacitor $C_2$ has the same voltage as the smoothing capacitor $C_1$. Therefore, there is no potential difference between the voltage $V_{c2}$ of the resonant capacitor $C_2$ and the voltage $V_{c1}$ of the smoothing capacitor $C_1$, and the voltage across the auxiliary switching element is zero. Therefore, in this state here, the switching of the auxiliary switching element $Q_A$ from the on-state to the off-state is performed with the zero current switching (ZVS).

When the auxiliary switching element $Q_A$ is switched from the on-state to the off-state, discharging of the resonant capacitor $C_2$ starts from the voltage $V_{c2}$.

(Operation Mode 7)

Figure 13:
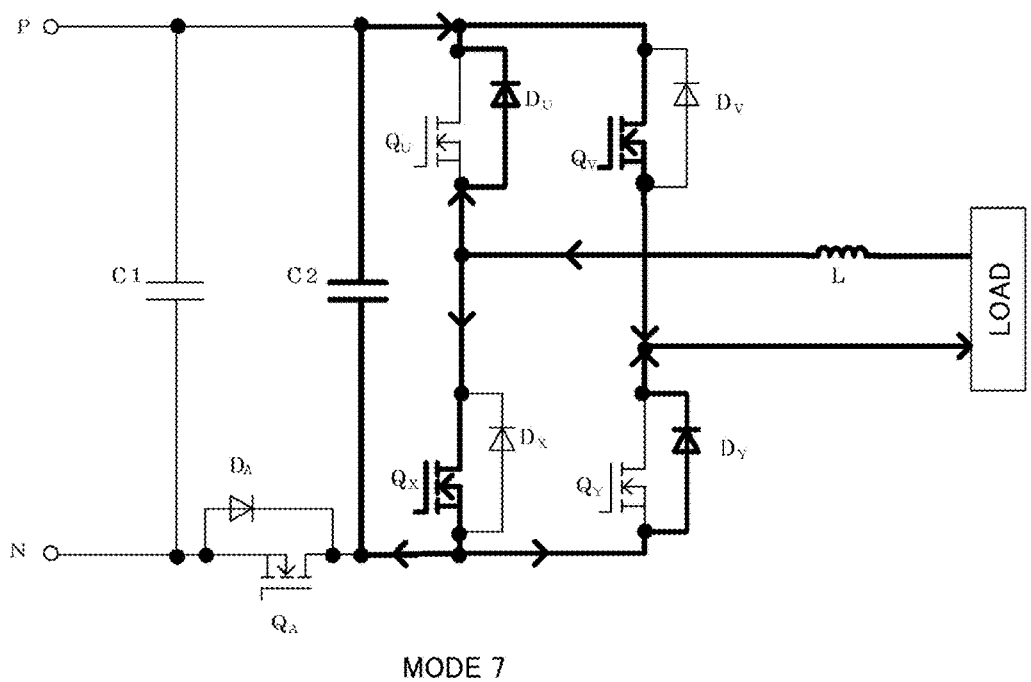
FIG. 13 is an operation diagram of the mode 7 for describing an operation example of the single phase inverter according to the present invention.

FIG. 13 illustrates the operation mode 7. When the voltage $V_{c2}$ reaches zero voltage according to the discharging of the resonant capacitor $C_2$, the operation mode 6 shifts to the operation mode 7.

In the operation mode 7, the resonant capacitor $C_2$, the bridge circuit, and the resonance reactor L are electrically separated from the DC power source side, and the resonance circuit is formed. As for the resonance current passing through the resonance circuit, the currents passing through the main switching element $Q_X$ and the main switching element $Q_V$ are shunted by the diode $D_Y$ and the diode $D_U$.

(Operation Mode 8)

Figure 14:
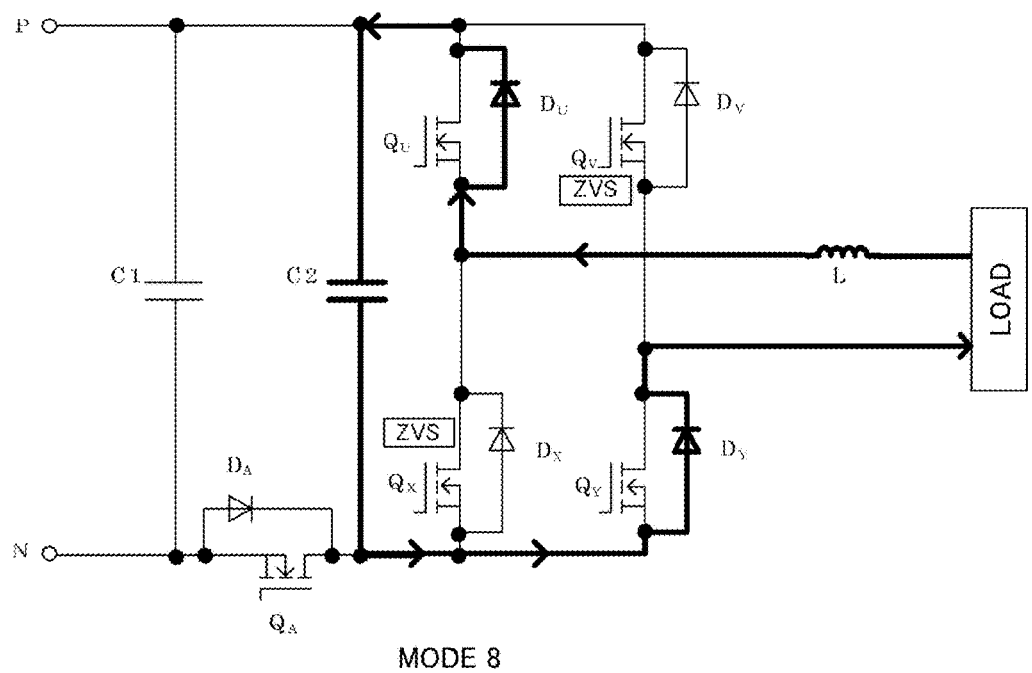
FIG. 14 is an operation diagram of the mode 8 for describing an operation example of the single phase inverter according to the present invention.

FIG. 14 illustrates the operation mode 8 in the state where the main switching elements $Q_V$ and $Q_X$ are switched from the on-state to the off-state. In the operation mode 7, at the point when the voltage $V_{c2}$ reaches zero voltage according to the discharging of the resonant capacitor $C_2$, the operation mode 7 shifts to the operation mode 8, and the main switching elements are switched from the on-state to the off-state.

At this point of time, since the voltage $V_{c2}$ of the resonant capacitor $C_2$ is zero voltage, the voltages $V_{QV}$ and $V_{QX}$ respectively across the main switching elements $Q_V$ and $Q_X$ are zero. Therefore, switching of the main switching elements $Q_V$ and $Q_X$ at this point, from the on-state to the off-state can be performed under the zero voltage switching (ZVS) condition.

When the main switching elements $Q_V$ and $Q_X$ shift to the off-state, the currents $I_{QV}$ and $I_{QX}$ of the main switching elements $Q_V$ and $Q_X$ become zero. Thereafter, charging of the resonant capacitor $C_2$ starts from zero voltage and the resonance current is inverted to pass through the diode $D_U$ and the diode D.

(Operation Mode 9)

Figure 15:
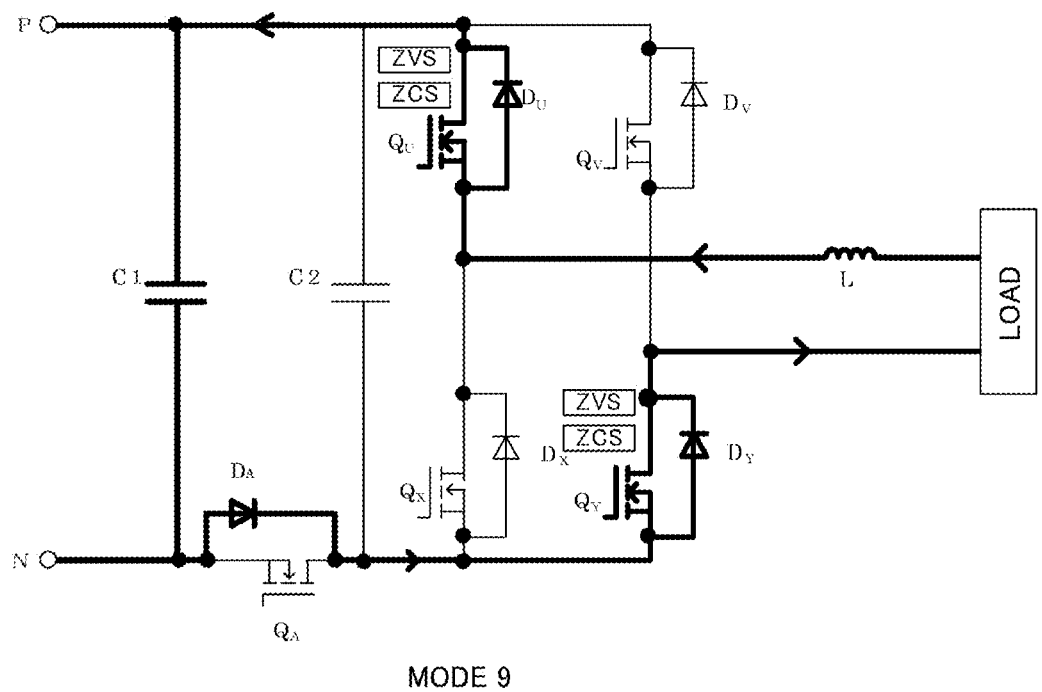
FIG. 15 is an operation diagram of the mode 9 for describing an operation example of the single phase inverter according to the present invention.

FIG. 15 illustrates the operation mode 9, showing the state where the main switching elements $Q_U$ and $Q_Y$ are switched from the off-state to the on-state. In the operation mode 8, since the voltage $V_{c2}$ of the resonant capacitor $C_2$ is zero voltage, the voltages $V_{QU}$ and $V_{QY}$ respectively across the main switching elements $Q_U$ and $Q_Y$ are zero. Therefore, switching of the main switching elements $Q_U$ and $Q_Y$ at this point, from the off-state to the on-state, can be performed under the zero voltage switching (ZVS) condition.

Further in the operation mode 8, the diode $D_U$ and the diode $D_Y$ are brought into conduction and the resonance current passes therethrough. Therefore, at this point, switching of the main switching elements $Q_U$ and $Q_Y$ from the off-state to the on-state can be performed under the zero current switching (ZCS) condition.

In the operation mode 8, when the resonant capacitor $C_2$ is charged, and the voltage $V_{c2}$ of the resonant capacitor is increased to the level that brings the diode $D_A$ into conduction, the operation mode 8 shifts to the operation mode 9, and the diode $D_A$ is brought into conduction. If voltage drop of the diode $D_A$ is ignored, the smoothing capacitor $C_1$ has the same potential as the resonant capacitor $C_2$, and this allows a regenerative current to pass from the resonance circuit side toward the power source side.

(Operation Mode 10)

Figure 16:
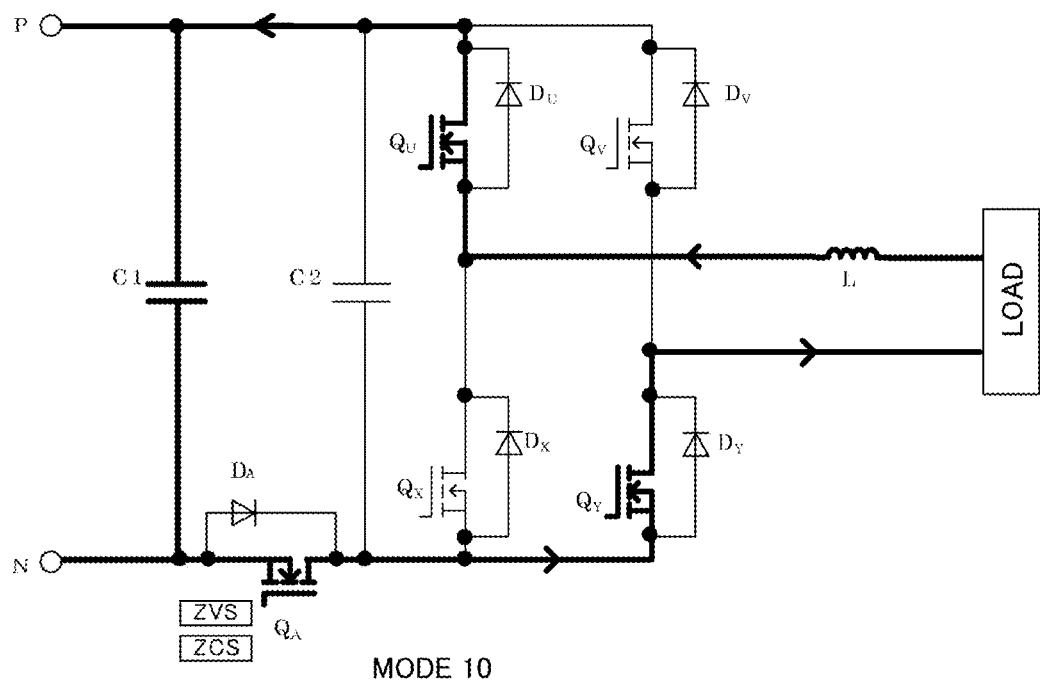
FIG. 16 is an operation diagram of the mode 10 for describing an operation example of the single phase inverter according to the present invention.

FIG. 16 illustrates the operation mode 10, showing the state where the auxiliary switching element $Q_A$ is switched from the off-state to the on-state. According to the operation mode 9, in the state where the smoothing capacitor $C_1$ and the resonant capacitor $C_2$ become the same potential, when the auxiliary switching element $Q_A$ is switched from the off-state to the on-state, this allows the zero voltage switching (ZVS) to be implemented, since the voltage across the auxiliary switching element $Q_A$ is zero voltage. Furthermore, since the regenerative current passes through the diode $D_A$, this allows the zero current switching (ZCS) to be implemented.

The aforementioned operation modes 1 to 5, and the operation modes 6 to 10 are shown in FIG. 20 and FIG. 21, respectively.

[Configuration Example of a Power Supply Device Using the Single Phase Inverter]

(Configuration Example of a Dual Cathode Power Supply Device)

Figure 17:
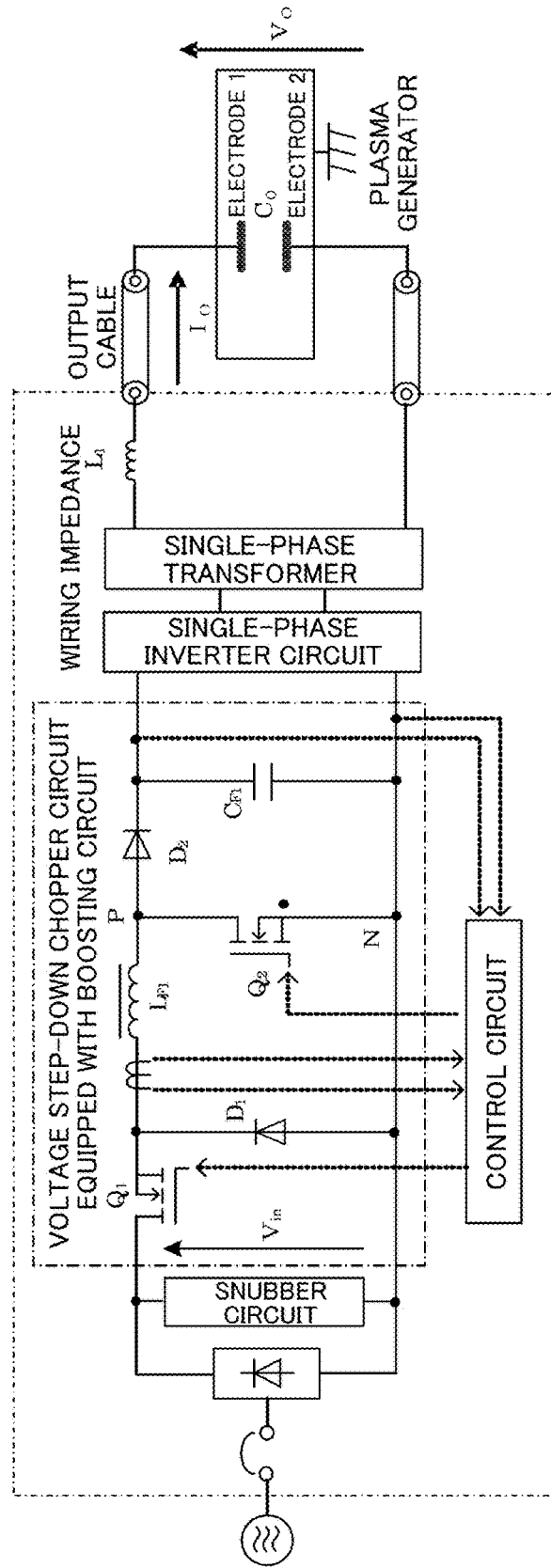
FIG. 17 illustrates a configuration example of a power supply device for plasma, using the single phase inverter according to the present invention.

FIG. 17 illustrates a configuration example of a dual-cathode power supply device to which the single phase inverter according to the present invention is applied.

The dual-cathode power supply device is a power source that supplies high-frequency power to a load of a plasma generator, and the plasma generator is provided with two electrodes; the electrode 1 and the electrode 2 within a case connected to ground. This dual cathode power supply device allows AC voltage, being electrically symmetric, to be applied to the two electrodes.

The dual cathode power supply device is provided with a rectifier configured to rectify AC power from an AC power source, a snubber that forms a protection circuit configured to suppress high voltage generated transiently, a current source step-down type chopper configured to convert DC power voltage being inputted from the rectifier to a predetermined voltage and output the DC current, a single-phase inverter configured to convert the DC output from the current source step-down type chopper to a multi-phase AC output, and a single-phase transformer configured to convert the AC output from the single-phase inverter to a predetermined voltage.

The dual-cathode power supply device supplies one output from the single-phase transformer to the electrode 1 via an output cable, and supplies the other output to the other electrode 2 via the output cable.

Figure 18:
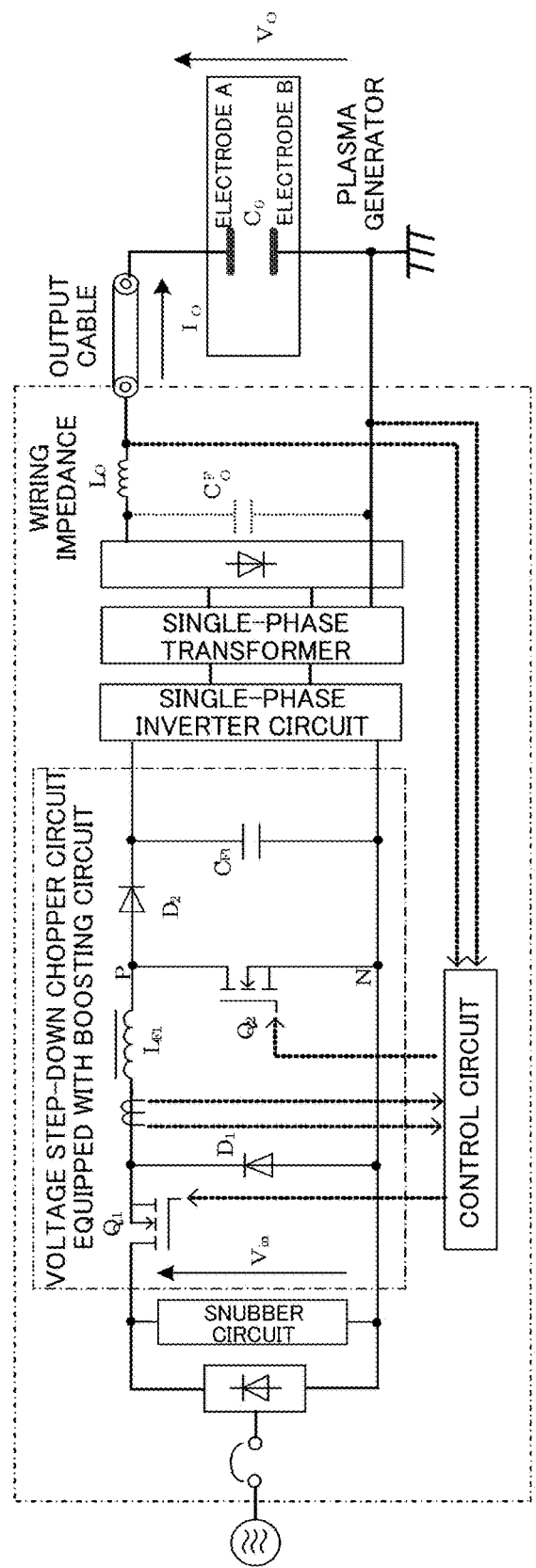
FIG. 18 illustrates a configuration example of the power supply device for plasma, using the single phase inverter according to the present invention.
Figure 19A:
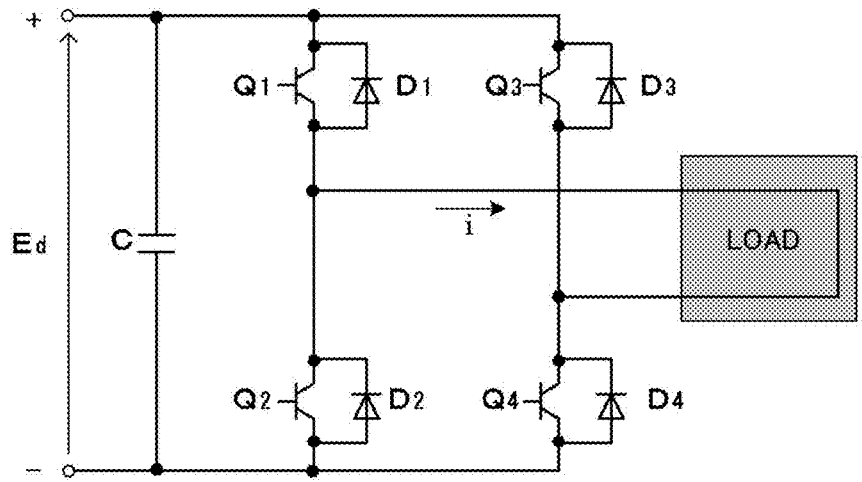
FIG. 19 is a circuit diagram for describing a typical circuit configuration of the single phase inverter.
Figure 19B:
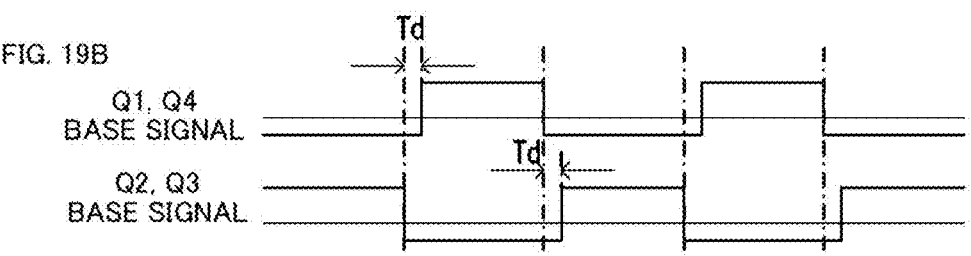
Figure 19C:
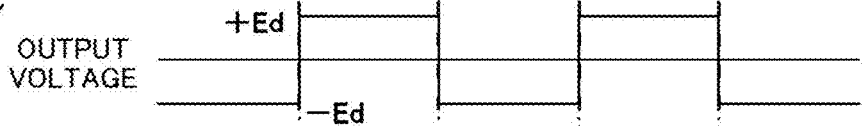
Figure 19D:
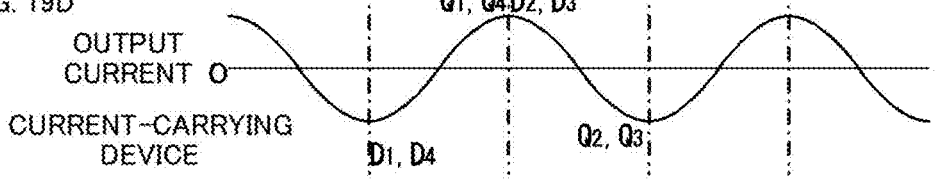

FIG. 18 illustrates a configuration example of a DC power supply device using the single phase inverter according to the present invention. The DC power supply device is a power source that supplies high-frequency power to a load of a plasma generator, and the plasma generator is provided with two electrodes; the electrode A to input DC voltage from the DC power supply device and the electrode B connected to ground. With this DC power supply device, the electrode B is connected to ground, and DC voltage is applied to the other electrode A.

The DC power supply device is provided with a rectifier configured to rectify AC power from an AC power source, a snubber that forms a protection circuit configured to suppress high voltage generated transiently, a current source step-down type chopper configured to convert the DC power voltage being inputted from the rectifier to a predetermined voltage and output the DC current, a single-phase inverter configured to convert the DC output from the current source step-down type chopper to a multi-phase AC output, and a single-phase transformer configured to convert the AC output from the single-phase inverter to a predetermined voltage, and a rectifying device configured to rectify the AC output from the single-phase transformer. The DC power supply device supplies the output from the rectifying device, to the electrode A via the output cable.

It is to be noted that the preferred embodiments and modifications described above are just examples of the current source inverter and the control method of the current source inverter relating to the present invention. It should be understood that the present invention is not limited to those embodiments but susceptible of changes and modifications on the basis of the spirit of the present invention, and all such modifications are not excluded from the scope of the invention.

INDUSTRIAL APPLICABILITY

The single phase inverter of the present invention may be applied to the dual-cathode power supply device for outputting AC, and to the DC power supply device for outputting DC.

EXPLANATION OF REFERENCES

1 Single phase inverter
2 Smoothing circuit
3 Auxiliary switching circuit
4 Resonant capacitor
5 Bridge circuit
6 Resonant inductor
6A Reactor element
7 Load
10 DC power source
A, B Electrode
C Floating capacitance
$C_1$ Smoothing capacitor
$C_2$ Resonant capacitor
$D_1$, $D_2$, $D_3$, $D_4$ Feedback diode
DA Diode
$D_U$, $D_X$, $D_V$, $D_Y$ Diode
$E_d$ DC voltage
$G_A$ Gate signal
$G_U$, $G_V$, $G_X$, $G_Y$ Gate signal
$I_{DA}$ Current
$I_{DV}$, $I_{DX}$ Current
$I_L$ Inductor current
$I_{QA}$ Current
$I_{QU}$, $I_{QV}$, $I_{QV}$, $I_{QX}$ Current
$I_{out}$ Resonance current
L Resonance reactor
$Q_1$, $Q_2$, $Q_3$, $Q_4$ Switching element
$Q_A$ Auxiliary switching element
$Q_U$, $Q_V$, $Q_X$, $Q_Y$ Main switching element

What is claimed is:

1. A single phase inverter comprising,
a bridge circuit including a series connection between a first main switching element and a second main switching element and a series connection between a third main switching element and a fourth main switching element, the series connections being connected in parallel with respect to a DC power source, and each of the main switching elements being connected to a diode in parallel, reverse-biased with respect to the DC power source,
a smoothing circuit, an auxiliary switching circuit, and a resonant capacitor, being connected in that order from the DC power source, between the DC power source and the bridge circuit, and
a resonant inductor being connected between a connection point of the first main switching element and the second main switching element, and a connection point of the third main switching element and the fourth main switching element in the bridge circuit, wherein,
the resonant capacitor and the resonant inductor form a resonance circuit, when an open operation by the auxiliary switching circuit disconnects the smoothing circuit from the resonant capacitor, and
a) in a switching operation by the main switching elements, from an off-state to an on-state,
a resonance current of the resonance circuit passes through the diodes of the bridge circuit being connected in parallel with the main switching elements, thereby achieving zero current switching for the main switching elements, and passing of the resonance current through the resonance circuit makes voltage across the main switching elements to be zero voltage so as to achieve zero voltage switching, thereby achieving the zero current switching and zero voltage switching for the switching operation by the main switching elements from the off-state to the on-state; and
b) in the switching operation by the main switching elements, from the on-state to the off-state,
discharging of the resonant capacitor with the resonance current makes a voltage across the capacitor to be zero voltage, and a voltage across the main switching elements becomes zero voltage, thereby achieving the zero voltage switching for the switching operation by the main switching elements from the on-state to the off-state, and
the switching operation by the main switching elements is performed by soft switching.

2. The single phase inverter according to claim 1, wherein,
the smoothing circuit comprises a smoothing capacitor being connected between a positive side and a negative side of the DC power source,
the resonant capacitor is connected between the positive side and the negative side of the DC power source,
the auxiliary switching circuit comprises an auxiliary switching element to open and close connection between the smoothing capacitor and the resonant capacitor, and a diode being connected in parallel with the auxiliary switching element, and
the auxiliary switching circuit disconnects the smoothing capacitor from the resonant capacitor, thereby forming the resonance circuit including the resonant capacitor and the resonant inductor, wherein,
a) in a switching operation by the auxiliary switching element, from an on-state to an off-state,
passing of supply current from the DC power source to a load makes a voltage of the resonant capacitor to be equal to a voltage of the smoothing capacitor, thereby achieving the zero voltage switching for the switching operation by the auxiliary switching element from the on-state to the off-state, and
b) in the switching operation by the auxiliary switching element, from the off-state to the on-state,
charging of the resonant capacitor with a current passing through the resonance circuit makes the voltage of the resonant capacitor to be equal to the voltage of the smoothing capacitor, thereby achieving the zero voltage switching for the switching operation by the auxiliary switching element from the off-state to the on-state, charging of the resonance capacitor brings the diode of the auxiliary switching circuit into conduction, the diode of the auxiliary switching circuit being connected in parallel with the auxiliary switching element, and a regenerative current passes through the diode of the auxiliary switching circuit from the load to the DC power source, thereby achieving zero current switching for the auxiliary switching element, and achieving the zero current switching and the zero voltage switching for the switching operation by the auxiliary switching element from the off-state to the on-state, and the switching operation by the auxiliary switching element is performed by soft switching.

* * * * *